United States Patent [19]

Kotler et al.

[11] 3,746,453

[45] July 17, 1973

[54] MOTION PICTURE SOUND PROJECTOR WITH AUTOMATIC FILM THREADING

[75] Inventors: Max Kotler, Montvale, N.J.; Morris Grossman, Jackson Heights, N.Y.

[73] Assignee: DeJur-Amsco Corporation, Long Island City, N.Y.

[22] Filed: Jan. 11, 1971

[21] Appl. No.: 105,460

[52] U.S. Cl. ............... 352/158, 352/159, 352/14, 352/29
[51] Int. Cl. ............................................ G03b 1/58
[58] Field of Search ............... 352/14, 29, 157, 352/158, 159

[56] References Cited
UNITED STATES PATENTS

| | | | |
|---|---|---|---|
| 3,201,020 | 8/1965 | Cherniavskyj | 352/158 X |
| 2,703,034 | 3/1955 | Thomas | 352/158 |
| 3,493,297 | 2/1970 | McKee | 352/159 X |
| 3,591,267 | 7/1971 | Kakiuchi | 352/29 |
| 1,991,870 | 2/1935 | Schulz | 352/228 |

Primary Examiner—Samuel S. Matthews
Assistant Examiner—Monroe H. Hayes
Attorney—James and Franklin

[57] ABSTRACT

A motion picture sound projector system embodying automatic film threading, characterized by the provision of a motion picture film gate, a sound producing mechanism and a film guiding loop former therebetween, so relatively arranged and organized as to provide a unitary, fixed system in which the motion picture sound film is automatically fed from and through the film gate, to and through the loop former and thence to and through the parts of the sound producer, providing a completely automatic or self-threading of the motion picture film for the motion picture sound projector system.

5 Claims, 9 Drawing Figures

INVENTORS
MAX KOTLER
MORRIS GROSSMAN
ATTORNEY

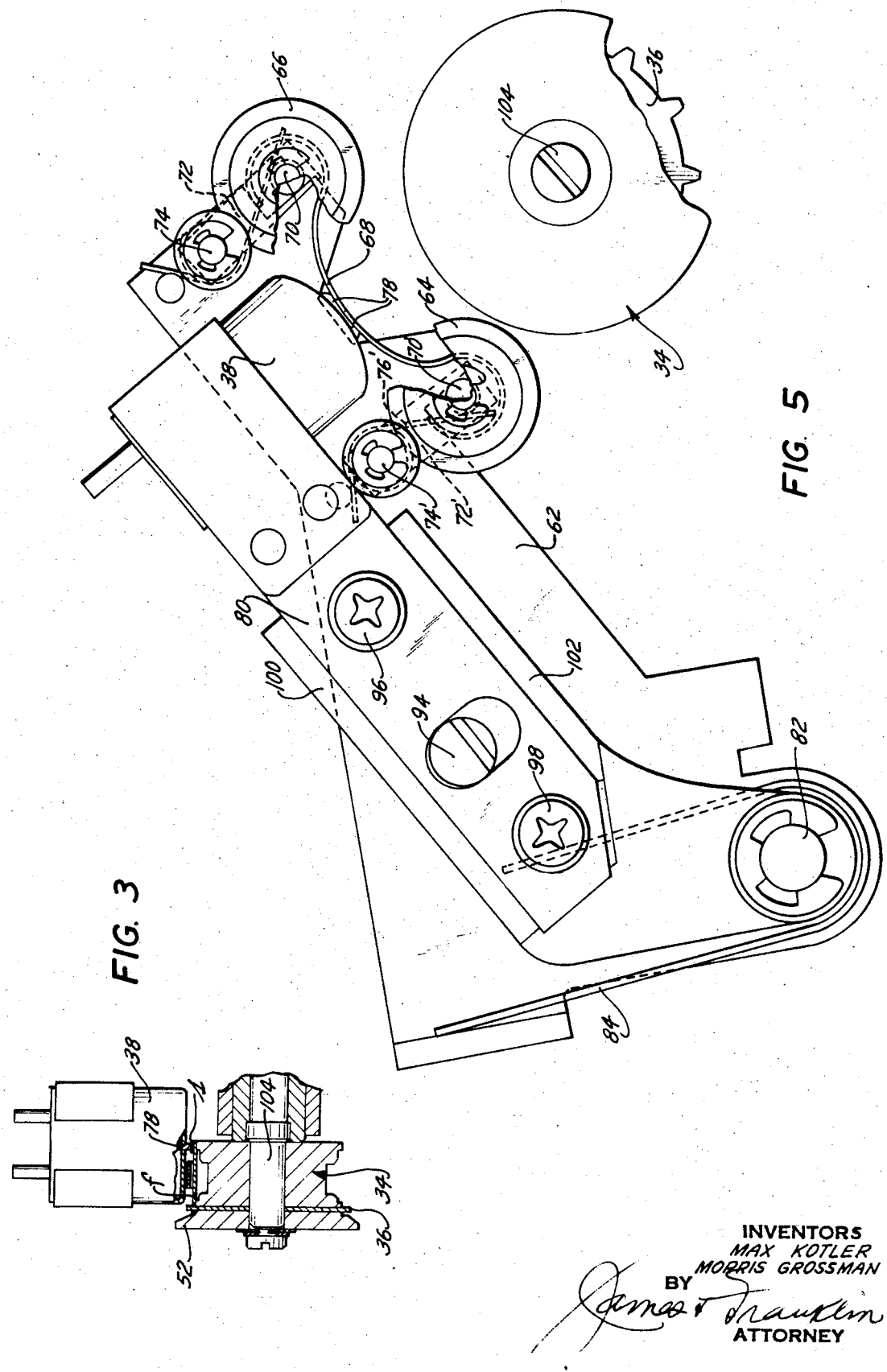

MOTION PICTURE SOUND PROJECTOR WITH AUTOMATIC FILM THREADING

This invention relates to a motion picture sound projector, and more particularly to one in which the motion picture sound film is automatically threaded through and from the motion picture film gate into and through the sound producing mechanism.

Threading an intermittently advancing motion picture film through and from a motion picture film gate into and through a continuously operable sound producing mechanism has presented a number of problems. In some known threading devices, loop-formers arranged between the motion picture apparatus and the sound producing mechanism are moved to loop-forming position during the threading stage and then are withdrawn from those positions during the operating or running stage of a machine. In such or other known machines in which the sound producing mechanism comprises a conventional continuously rotatable sound drum and a cooperating sound pick-up head (contactable with the film during film engagement with the sound drum) the pick-up or magnetic head has to be moved toward and away from the cooperating drum during the running and threading stages respectively, or both.

In some such projectors, the sound drum which includes a sprocket for engaging and continuously moving the film through the sound producing mechanism, is located in close proximity to the magnetic head while in other projectors the magnetic head and sprocket are considerably spread apart. In conventional systems embodying such arrangements, when the machine is started, the leading edge of the film is fed past the projector film aperture and through the film gate for a length sufficient to reach a take-up spool and then stopped. In these latter systems, it is necessary at this point to open the film path between the gate and the take-up spool so as to obtain access to the film path in order to thread the film past the magnetic head, and around the sprocket, and then, having accomplished this, to close and lock the projector system.

All of these motions in known picture sound projectors, have to be manually or otherwise performed.

The main object of our present invention is to provide a motion picture sound projector devised to permit feeding the motion picture sound film from the film gate, into and through the sound producing mechanism, and particularly between the sound drum (and its sprocket) and the magnetic head by completely automatic means, requiring no manual operation whatsoever.

In the structure and operation of the motion picture sound projector of the present invention the completely automatic threading of the motion picture sound film between the film gate of the motion picture projector and the sound producing mechanism is accomplished by the provision of an apparatus characterized by the following structural improvements:

1. the motion picture film gate and the sound producing mechanism are made to embody a substantially unitary structure in which the continuously rotatable sound drum is not only arranged adjacent or close to the exit end of the film gate but is fixedly mounted (thereby requiring no manual displacement) with reference to the film gate;

2. for creating the required loop between the intermittently advancing motion picture film and the continuously operable sound producing mechanism there is provided a film guide member fixedly mounted directly between the film gate and the sound producing mechanism, said film guide member having a film guiding surface positioned between the exit end of the film gate and the sprocket of the sound producing mechanism acting for directly receiving the film from the film gate and directing the same onto the sprocket of the sound producing mechanism and between the latter and the pick-up or magnetic sound head, the said curved film guiding surface defining a fixed loop former between the film gate and said sound producing mechanism; and 3. the sound producing mechanism, comprising the film engaging sprocket and the sound pick-up head are so structured with reference to the film guiding member and with reference to each other so that the motion picture sound film is automatically fed from the loop former into and through the parts of the sound producing mechanism without the need of manually moving the pick-up head from and back to the sprocket during the threading operation thereby completing the fully automatic or self-threading of the motion picture sound film through the motion picture projector and the sound producing or reproducing mechanism.

To the accomplishment of the foregoing objects and such other objects as may hereinafter appear, our invention relates to a combined motion picture projector and sound producing (or reproducing) machine as is more particularly defined in the appended claims considered together with the following description and the appended drawings in which:

FIG. 3 is a cross-sectional view of the latter mechanism taken in section along the broken line 3—3 of FIG. 1;

Figure 1:
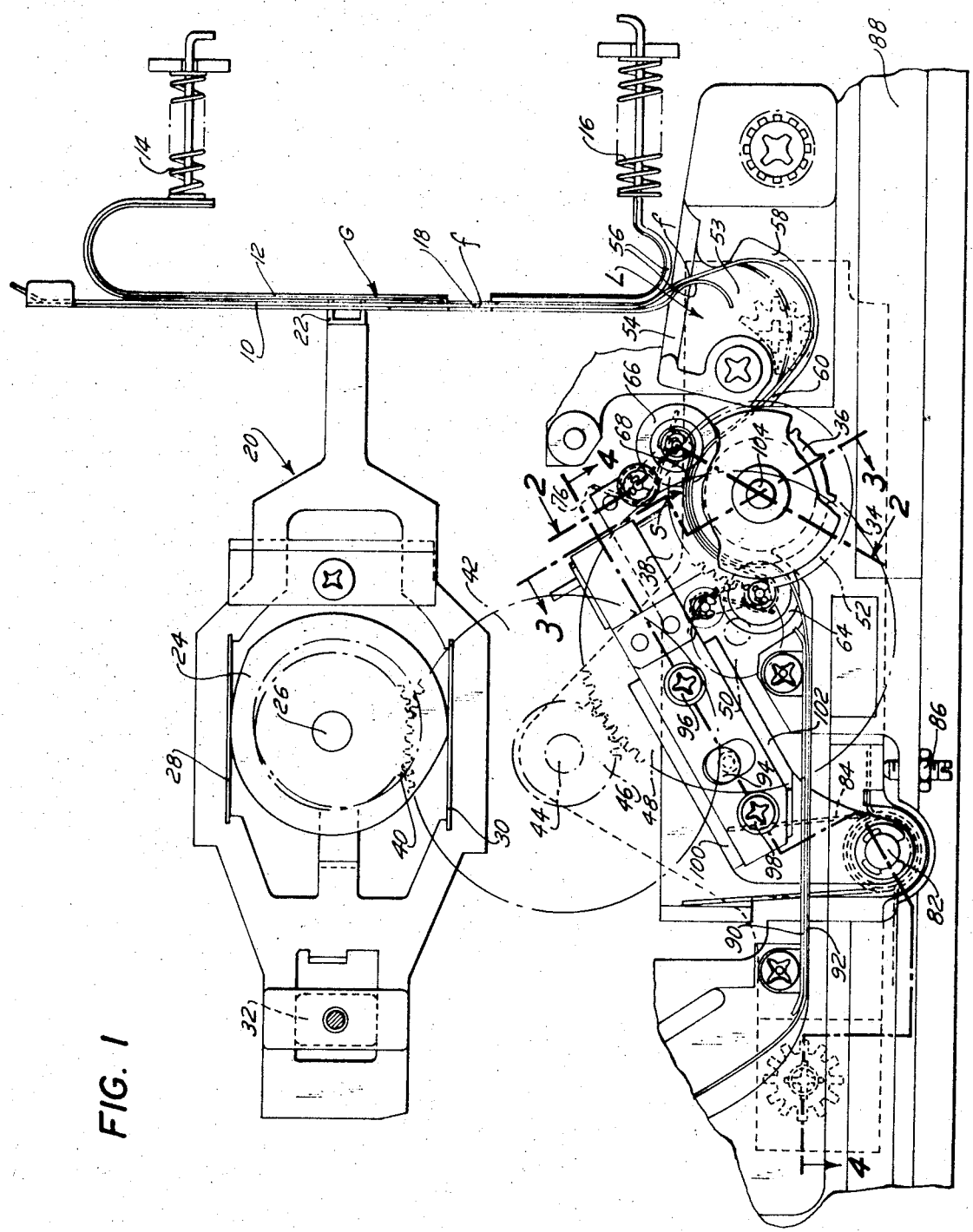
FIG. 1 is a front elevational view of the essential parts of the motion picture sound projector machine of the invention, showing the motion picture sound film as it is automatically threaded through the machine.
Figure 4:
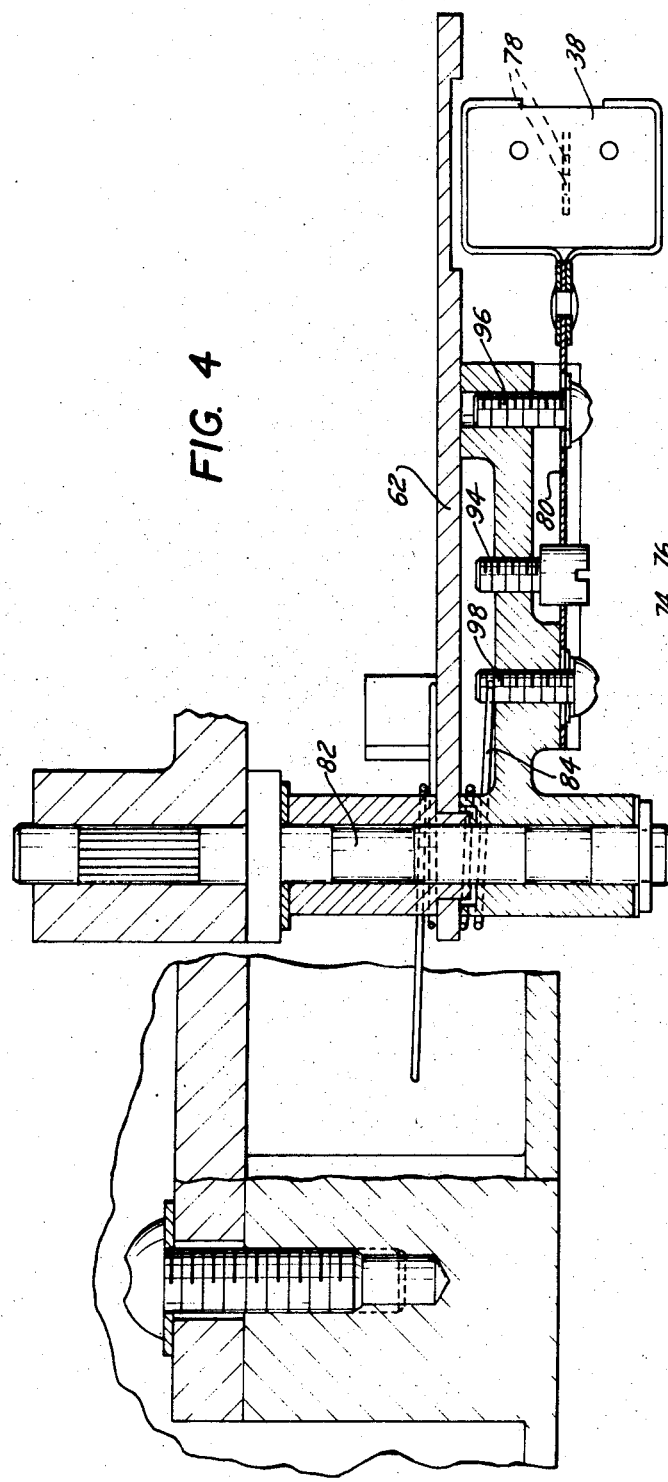
FIG. 4 is an in-plan cross-sectional view of a part of the machine shown in FIG. 1 taken in section along the broken line 4—4 thereof.
Figure 2:
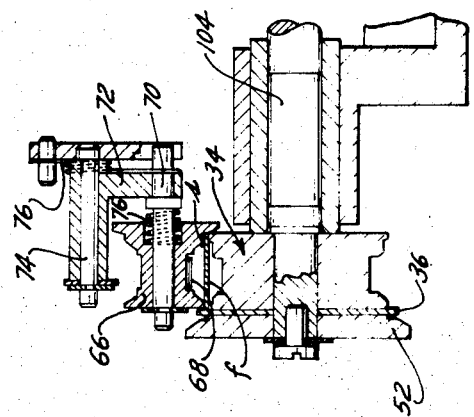
FIG. 2 is a cross-sectional view of a portion of the sound producing mechanism of the machine taken in section along the broken line 2—2 of FIG. 1.

FIG. 5 is a vertical elevational view of the part of the machine shown in FIG. 4, depicting the same in a drum disengaged position (FIG. 1 showing said machine part in a drum engaged position); and FIGS. 6 to 9 are views showing in sequence the automatic threading movement of the film as it is advanced from the film gate of the projector, through the fixed loop-former and into and between the sprocket and the pick-up sound head of the sound producing mechanism.

Referring now more in detail to the drawings and having reference first to FIG. 1 thereof, the motion picture sound projector of the invention comprises in its improved automatic film threading mechanism a projector film gate generally designated as G, forming part of the film feeding or transport means of the projector through which gate film is intermittently advanced during film projection, a sound producing mechanism generally designated as S fixedly mounted with reference to said film gate and a film guide member defining a fixed loop former generally designated as L arranged between the said film gate and the sound producing mechanism acting for directly receiving the film from said film guide G and directing the same onto the elements of the sound producing mechanism S.

The film gate G comprises a projector aperture plate 10 and a pressure plate 12 the latter biased by the pressure springs 14 and 16, the film aperture 18 being formed, as conventional, in the film gate G. With the film gate is associated the film feeding or transport means generally designated as 20, having a construction as disclosed in the Kotler et al. Pat. No. 3,524,573, patented Aug. 18, 1970 the same comprising in its essential elements a film engaging and driving claw 22, the film feeding action of which is operated by means of a cam 24 affixed to a main shaft 26 which cam rotates between shoes 28 and 30 acting as cam followers. The film transport means 20 is pivotally mounted about a retainer 32, which latter comprises a bearing serving both as a pivot about which the film transport means 20 oscillates and as a confining element such that slidable in-and-out motion of the film transport means is permitted. The detailed structure and operation of this film transport means is disclosed in said Kotler, et al patent.

The sound producing mechanism S, best shown in FIGS. 2 - 5 of the drawings, comprises a continuously rotatable sound drum, generally designated as 34, fixedly mounted as aforesaid, with reference to the film gate G, said sound drum having a sprocket 36 with teeth engageable with the film perforations of a motion picture film $f$ (see particularly FIGS. 2 and 3), said sound producing mechanism also including a magnetic pick-up head 38 (see FIGS. 3 and 4) contactable with the film and particularly with a sound stripe $s$ on the film (see FIG. 3) during film engagement with the sound drum 34, co-action between the sound drum and the pick-up head being effected by means to be described hereinafter.

The film transport means 20 and the sound drum 34 are geared for driving the sprocket 36 at the same linear speed as that of the film in the film gate G, the gearing therefor comprising a pinion 40 affixed to the drive shaft 26 meshing with a gear 42 rotatable about a shaft 44, having a pinion 46 meshing with a gear 48, the said gear being formed with a pinion 50 which meshes with and drives a gear 52 forming part of the drum 34.

The fixed or fixedly mounted film guide and loop former L comprises a member which is formed with an open throat 54 in direct communication with the curved ends 56 of the film gate G, with a curved guide surface 58 (see particularly FIG. 1) positioned between the exit ends 56 of the film gate and the sprocket 36 of the sound producing mechanism, and with an exit opening 60 in direct confrontation with the sprocket 36, the curved film guiding surface 58 thereby providing a fixed film guiding loop former path between said entrant throat 54 and said exit opening 60. The entrant throat 54 and the exit opening 60 of the film guide member lie at substantially right angles with each other as is best shown in FIG. 1 of the drawings. It may also be noted at this point that the sound pick-up head 38 (FIG. 1) is positioned above the line of direct communication between the exit opening 60 and the sprocket 36, whereby the film when engaged by the teeth of said sprocket may be moved directly between the sound head 38 and the sound drum 34.

The film guide member and loop former L is formed with a chamber 53 between its entrant and exit openings so as to permit the film $f$ as it is advanced from the film gate to the sound producing mechanism to move toward and away from the curved surface 58 of the loop former, spaced from engagement with the curved surface, as the film moves between its intermittent projector gate action and the continuous sprocket actuated action, this "breathing" movement of the film in the fixed loop former being indicated by the full and dash-dotted positions shown in FIG. 1, this action to be further explained herein below in connection with FIGS. 6 - 9 of the drawings.

The sound producing mechanism S, comprising the film engaging sprocket 36 and the sound pick-up head 38 are so structured with reference to the film guiding and loop forming member L and with reference to each other so that the motion picture sound film is automatically fed from the loop former L into and through the parts, namely the sprocket 36 and the sound head 38, of the sound producing mechanism without the need of manually or otherwise moving the pick-up head from and back to the sprocket during the threading operation. This is accomplished by the relation described above between the exit opening 60 of the loop former L and the sprocket 36 and by providing a support 62 for the sound head 38, including spaced rollers 64 and 66 (see particularly FIGS. 5 and 1) mounted on the support 62, the rollers being engageable with untoothed surfaces of said sprocket and a flexible curved guide 68 bridging said rollers, said curved guide lying concentrically with and in close proximity to the untoothed surface of said sprocket. By this means the film $f$ engaged by the teeth of said sprocket is moved and guided by the rollers and the said curved guide 68 between the sound head 38 and the sprocket 36.

By means of the coordinated devices or mechanisms thus far described, a fully automatic or self-threading of the film, without the need of any manual intervention and without the need of any relative movement being required between the parts of the mechanism, is produced through the motion picture projector and the sound producing or reproducing mechanism.

Figure 6:
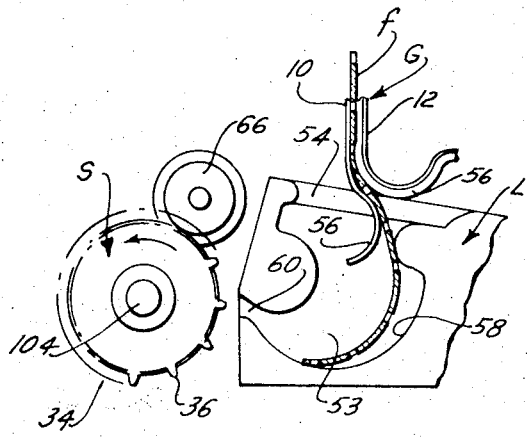

The operation described is illustrated in the sequential views shown in FIGS. 6 to 9 of the drawings. In FIG. 6, it can be seen that the film assumes substantially the shape shown when it has partially penetrated the loop former. The shape of the film curve is determined by the shape of the loop forming surface configuration 58 and the exit or end shapes of the aperture plate 56 and pressure plate combination of the gate G.

Figure 7:
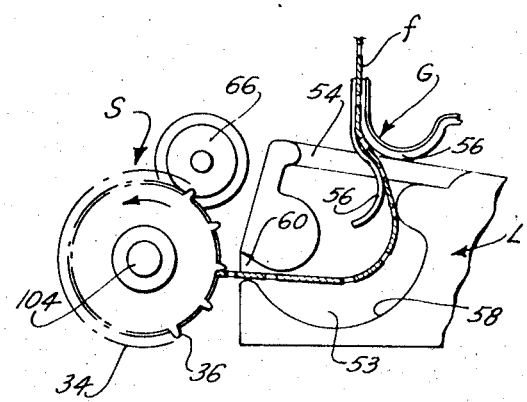

The film is progressively advanced in the gate G until it assumes the shape and position illustrated in FIG. 7. In essence what occurs is that the film is being further stressed the further it penetrates the chamber of the loop former L. At a point close to the end of the loop former, or at the end, the film has been sufficiently stressed so that it reacts as would a thin, flat spring, causing the leading end of the film to eject suddenly and instantly through the exit opening 60 of the loop former, the leading edge of the film confronting and abutting the surface of the sprocket 36 surface somewhat underneath the trailing edge of the sprocket tooth as illustrated. Since the pull-down cam and claw of the projector and the sprocket teeth of the sound drum are all interconnected by gears, the proper relationship between the leading edge of the film and sprocket teeth is always maintained.

Figure 8:
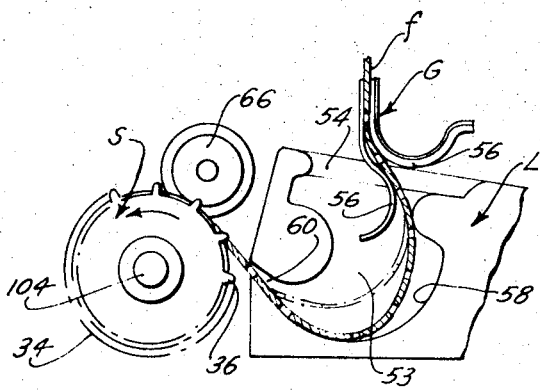
Figure 9:
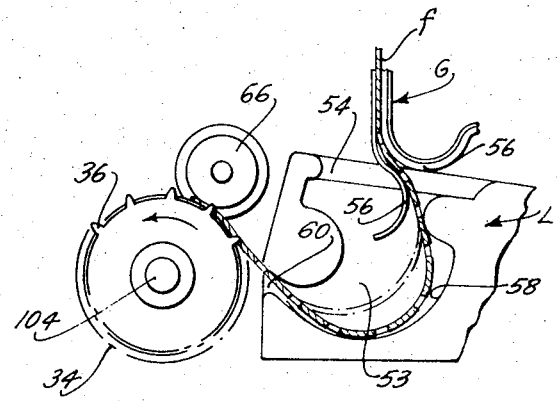

FIG. 8 illustrates the relationship of the film surface to the loop former after the sprocket has revolved two teeth. The first film perforation has been engaged by a sprocket tooth and transported further along its assigned path, the stresses now inherent in the curved film urging the leading portion of the film to press against the film carrying surface of the sprocket 36. FIG. 9 illustrates the still further travel of the film around the sprocket and into engagement with the roller 66.

The rapid ejection of the film as shown in FIG. 7 has the effect of shortening the film path as compared to the length of the loop former surface 58. By this means the film is removed from further contact with the surface of the loop former. The film in its further operation moves in the film former between the full and dot-dash positions shown on FIGS. 8 and 9 spaced from and out of contact with the surface 58 of the film former. The fact that the first frames of the film may contact the surface is of no consequence; if marring of the first film surfaces occurs they are not projected and therefore unseen by the viewer. Further, in most instances, the film is preceded by an opaque leader upon which marring has no effect.

The elements of the motion picture sound projector above described are suitably mounted and supported to perform their described functions.

Roller 66 is rotationally mounted on a stud 70 (see FIGS. 1, 2 and 5) which is pivotally mounted in an arm 72 rotationally mounted on a stud 74. The surface of the roller 66 is held in contact with the untoothed surface of the sprocket 34 by means of a torsion spring 76. The roller 64 is supported by similar mechanism which includes the stud 70', the arm 72', the stud 74' and a torsion spring 76' (see particularly FIG. 5).

The magnetic head 38 having the poles 78 is mounted on a flexible supporting member 80 which in turn is mounted on the arm 62. Arm 62 is pivotally carried or mounted on a fixed stud 82, and a clockwise rotation is imparted to the assembly of the flexible support and its mounting arm by means of a torsion spring 84 (see particularly FIGS. 4 and 5). Rotation is limited by adjustment of a screw 86 carried by a base member 88. Adjustment screw 86 is set so that the gap between the magnetic head poles 78 and the untoothed portion of the sprocket 34 is less than one film thickness, the said poles being never in physical contact with the said sprocket (see particularly FIG. 3). Film guide 90 and the film guide 92 of the sound producing unit are in fixed relationship with each other, the space between these film guides providing a path for the film travel through the sound producing mechanism.

The flexible support 80 carrying the magnetic head 38 is adjustably mounted on the supporting arm 62 by means of the eccentric screw 94, an adjusting screw 96, and a locking screw 98 (see particularly FIGS. 4 and 5). The flexible support 80 is further contained within the supporting arm 62 by means of two side rails 100 and 102, thus confining the flexible support 80 to a substantially parallel motion with the longitudinal axis of the arm 62 when the eccentric screw 94 is rotated. Rotation of the adjusting screw 96 causes the flexible support 80 to move in or out depending on the direction of screw rotation. Deflection of the support 80 is assured by preforming the support such that it is at all times resting on the underneath surface of the adjusting screw 96; displacement of the screw 96 displaces the support 80. The lateral and longitudinal adjustments are provided in order to obtain optimum positioning of the poles 78 and of the magnetic head 38 with respect to the magnetic stripe s on the film. Ideally, the poles should be laterally centered with respect to the magnetic stripe and the gap between the poles should lie at a point tangent to the film carrying surface of the sprocket 36, the normal of said tangent bisecting the gap between the poles 78. The torsion spring 84 exerts sufficient pressure so as to insure contact of the poles 78 with the magnetic stripe of the film and with insufficient pressure to cause any mechanical or electrical noise or excessive wear on the contacting parts. FIG. 1 depicts the magnetic head and its supporting means in operative position while FIG. 5 shows the same in an inoperative or disengaged position to provide the facility for cleaning the elements thereof as may be desired.

As clearly shown in FIG. 1 of the drawings, and to carry out the unitary relationship between the gate G, the loop former L and the sound producing means S, as well as the associated parts for the sound producing mechanism, the loop former L and the sound producing mechanism and associated parts are all mounted on the fixed base 88 and secured thereto by the screws or bolts clearly depicted in FIG. 1 of the drawings. The sound drum 34 is rotatably mounted on a stud 104 fixedly supported on the base 88.

The operation of the motion picture sound projector of the invention will be apparent from the above description of the structure and operation of the parts thereof. The motion picture sound projector of the invention provides a machine in which the completely automatic threading of the motion picture sound film between the film gate G of the projector and the sound producing mechanism S is accomplished by the provision of an apparatus in which a motion picture film gate G of a projector, a loop former L fixedly mounted with reference to the gate G and a fixedly mounted sound producing mechanism S are made to embody a substantially unitary system, the parts being so relatively arranged, organized, and interrelated as to obviate the necessity for requiring any manual displacement of any of the parts thereof for threading of the film to and through the film gate and thence to and through a loop former and a sound producing mechanism. It will be apparent that many changes may be made in the described structure of the machine without departing from the spirit of the invention defined in the following claims.

We claim:

1. A motion picture sound projector with automatic film threading comprising:
   a motion picture projector having a film feeding means and a film gate through which film is intermittently advanced during film projection;
   a sound producing mechanism having a continuously rotatable sound drum fixedly mounted with reference to said film gate, said sound drum having a sprocket with teeth engageable with the film perforations;
   said sound producing mechanism having a pick-up head fixed in contact with the film during film threading engagement with the sound drum;
   means connecting the said film feeding means and said drum for driving said sprocket at the same linear speed as that of the film in said film gate; and
a film guide member fixedly mounted directly between said film gate and said sound drum;
said film guide member having a curved film guiding surface positioned between the exit end of said film gate and the said sprocket acting for directly receiving the film from said film gate and threadingly directing the same onto the said sprocket and between the latter and the sound pick-up head, the said curved film guiding surface defining a fixed loop former between said film gate and said sound head.

2. The motion picture sound projector of claim 1, in which said fixed film guide member has an open entrant throat in direct communication with the end of the film gate and an exit opening positioned in a line of direct confrontation with said sprocket, the curved film guiding surface providing a fixed film guiding loop former path between said entrant throat and said exit opening.

3. The motion picture sound projector of claim 2 in which the sound head is positioned above the line of direct communication between the said exit opening and said sprocket whereby the film when threadingly engaged by said sprocket teeth is moved directly by the sprocket between the fixed in contact sound head and the sound drum.

4. The motion picture sound projector of claim 1 in which is provided:
a support for said sound head including spaced rollers mounted on the support, said spaced rollers being enageable with untoothed surfaces of said sprocket; and
a flexible curved guide bridging said rollers, said curved guide lying concentrically with and in close proximity to the untoothed surface of said sprocket,
whereby film threadingly engaged by the teeth of said sprocket is moved, guided by said rollers and the curved guide directly between the sound head and the sprocket.

5. The motion picture sound projector of claim 1, in which the film guide member is chambered to permit the film to move toward and away from the curved path of the film guide member as the film moves between its intermittent projector gate action and its continuous sprocket actuated action.

* * * * *